(12) United States Patent
Mednick et al.

(10) Patent No.: US 7,677,722 B1
(45) Date of Patent: Mar. 16, 2010

(54) DEVICE FOR ATTACHING TO EYEGLASS FRAME

(76) Inventors: Rita Mednick, 29552 Teracina, Laguna Niguel, CA (US) 92677; Bonnie S. Ferguson, 38 Rambling La., Aliso Viejo, CA (US) 92656

( * ) Notice: Subject to any disclaimer, the term of this patent is extended or adjusted under 35 U.S.C. 154(b) by 0 days.

(21) Appl. No.: 12/390,041

(22) Filed: Feb. 20, 2009

(51) Int. Cl.
*G02C 5/14* (2006.01)
(52) U.S. Cl. .................... 351/112; 351/111
(58) Field of Classification Search ........... 351/112, 351/111, 121, 41, 158; 24/3.3, 3.4, 3.9, 326, 24/336
See application file for complete search history.

(56) References Cited

U.S. PATENT DOCUMENTS

| | | | |
|---|---|---|---|
| 4,894,887 A | 1/1990 | Ward, II | |
| 4,903,375 A | 2/1990 | DiFranco | |
| 5,235,727 A | 8/1993 | McCloskey | |
| 6,017,120 A | 1/2000 | McCormick | |
| 6,210,003 B1 * | 4/2001 | Chan | 351/112 |
| 6,848,787 B2 | 2/2005 | Dietz | |
| 6,863,394 B1 | 3/2005 | Nelson et al. | |

* cited by examiner

*Primary Examiner*—Hung X Dang
(74) *Attorney, Agent, or Firm*—Robert J. Baran

(57) ABSTRACT

The present invention provides a device for securing to the stem of an eyeglass frame comprising (a) a sleeve member having an inner surface and an outer surface; (b) a dividing member within said sleeve member, said dividing member having a first edge and a second edge, said first edge being secured to the inner surface of said sleeve member along a first line and said second edge being secured to a second line that is substantially parallel to said first line and spaced there from to thereby define a first channel and a second channel within said sleeve member, said first channel being configured for receiving an eyeglass stem and securing said device to said eyeglass stem and said second channel being configured for retaining an anchor member within said sleeve member; and (c) a clip comprising an anchor member and an arm, said anchor member being retained within said second channel and said anchor member having a first edge and said being arm secured to said first edge of said anchor member and oriented over the outer surface of said sleeve member.

11 Claims, 1 Drawing Sheet

DEVICE FOR ATTACHING TO EYEGLASS FRAME

BACKGROUND OF THE INVENTION

1. Field of the Invention

The present invention provides an attachable clip for eyeglasses which is characterized in securing a decoration or logo to the eyeglass frame and providing a secure attachment of the eyeglasses to the clothes of the wearer.

2. Background of the Related Art

Typical eyeglasses consist of a frame body that houses two lenses on either side of a nosepiece. Attached to the frame body, usually by hinge and screw, are two temple bars that extend from two ends of the frame body. The temple bars pivot between an open position perpendicular with the frame body and a closed position parallel with the frame body. The temple bars and nose piece support the frame on the head of the wearer.

Individuals often remove their eyeglasses temporarily. They may put them down and not recall where, they may hang them around their neck where they bounce against their chest, or they may put them in a pocket and have them fall out and/or get damaged.

To solve this problem, the prior art teaches using mechanical clasps to clip eyeglasses to a garment worn by the user. These are cumbersome and, like all mechanical clasps, may come loose. Some mechanical clasps also depend on the availability of a shirt pocket, a cap visor, belt, holder, straps, or the like. In addition, clips may work well initially, but fatigue can cause metal clips to weaken and lose their ability to hold eyeglasses securely. Moreover, clips can break, thereby causing the eyeglasses to come loose, fall and break, or be lost.

Means for attaching eyeglasses to other objects, for example, the clothing of a wearer, for the purpose of avoiding loss or other purposes are known. The eyeglass may be attached in position suitable for wear or can be reversibly removed from attachment from the clothes, etc. of the wearer. See for example, U.S. Pat. No. 4,894,887 to Ward which shows an eyeglass retaining carrier device which clips one of the temple sidepieces to the clothing of a wearer, as shown in a downward inclination from a pocket. See also U.S. Pat. No. 5,235,727 to McCloskey which discloses a similar device for clipping an eyeglass frame to the clothing of the wearer. Again, the attachment of the eyeglass to the clothing is reversible.

Another device for attaching eyeglasses to clothing utilizes two magnets that align when closed on opposite sides of a clothing material to hold the eyeglasses in place. See U.S. Pat. No. 6,848,787 B2 to Dietz. This device also provides reversible removal.

Thus, it is clear that there are many devices for attaching a clip or similar securing means to an eyeglass frame for affixing said eyeglass to the clothing of a wearer, but few attempts have been made to fix decorating and/or logo to eyeglass frames by such clips.

Nevertheless, means for attaching decorative objects to eyeglasses are also known. See, for example, U.S. Pat. No. 6,863,394 B1 to Nelson, et al. which discloses an ornamental attachment for selective attachment to an existing pair of glasses. This device utilizes the hinged junction of the eyeglass stem for attaching said ornamental attachment by means of a screw that replaces the existing screw of the eyeglass. It will be appreciated that, because of the size of a typical eyeglass screw, it is difficult to use this device.

Thus, it is one object of this invention to provide a device for attaching a decoration or a logo to an eyeglass frame that is easy to manufacture and can be affixed to various shaped eyeglass stems and/or stems of varying widths and thicknesses with ease and without the use of tools.

The above and further features of the invention will be better understood with respect to the following detailed description of the preferred embodiment considered in combination with the several figures of the accompanying drawings.

SUMMARY OF THE INVENTION

The present invention, as set forth below and, in particular FIGS. 1 through 5, provides a device (11) for securing a clip to the stem (21) of an eyeglass frame (20) comprising; (a) a sleeve member (13) having an inner surface (17) and an outer surface (15); (b) a dividing member (10) within said sleeve member, said dividing member having a first edge (12) and a second edge (14), said first edge being secured to the inner surface of said sleeve member along a first line and said second edge being secured to a second line that is substantially parallel to said first line and spaced therefrom to thereby define a first channel (16) and a second channel (18) within said sleeve member, said first channel (16) being configured for receiving an eyeglass stem (21) and securing said device (11) to said eyeglass stem and said second channel (18) being configured for retaining an anchor member within said sleeve member; and (c) a clip (51) comprising an anchor member (53) and a logo-bearing arm (52), said anchor member being retained within said second channel and said anchor member (53) having a first edge (53a) and said logo-bearing arm (52) being secured to said first edge (53a) of said anchor member and oriented over the outer surface (15) of said sleeve member (13).

Preferably, said sleeve member comprises a resilient material capable of resiliently engaging the stem of an eyeglass frame body to reversibly secure said device to said stem of said eyeglass frame body.

Preferably, said dividing member comprises a resilient material capable of resiliently engaging the stem of an eyeglass frame body to reversibly secure said device to said stem of said eyeglass frame body.

More preferably, both of said sleeve member and said dividing member comprise a resilient material capable of resiliently engaging the stem of an eyeglass frame body to reversibly secure said device to said stem of said eyeglass frame body.

Preferably, said anchor member comprises a rigid material formed to provide multiple gripping points along said stem of said eyeglass frame body.

Preferably, said rigid material is selected from the group consisting of plastics, rubbers, e.g. Neoprene, metals, etc.

BRIEF DESCRIPTION OF THE DRAWINGS

The present invention is described in the drawing figures in which.

DETAILED DESCRIPTION OF THE INVENTION

Figure 1:
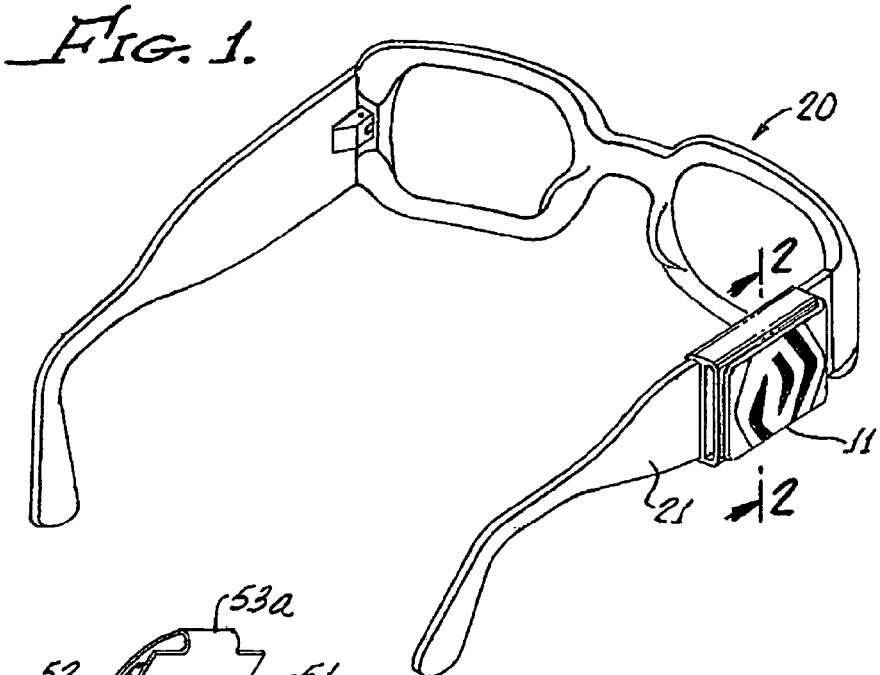
FIG. 1 shows a device according to the present invention attached to eyeglasses and including a decorative logo.
Figure 4:
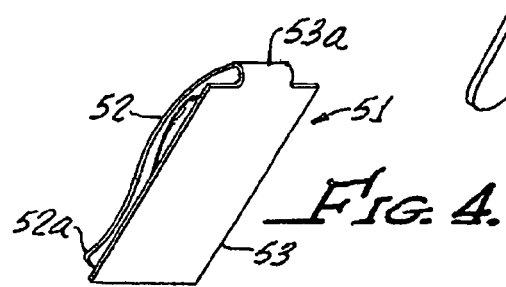
FIG. 4 shows the clip utilized in the device of this invention.

The Drawing Figures show a device (11) for securing to the stem (21) of an eyeglass frame (20) comprising (a) a sleeve member (13) having an inner surface (17) and an outer surface (15); (b) a dividing member (10) within said sleeve member, said dividing member having a first edge (12) and a second edge (14), said first edge being secured to the inner surface of said sleeve member along a first line and said second edge being secured to a second line that is substantially parallel to said first line and spaced there from to thereby define a first channel (16) and a second channel (18) within said sleeve member, said first channel (16) being configured for receiving an eyeglass stem and securing said device to said eyeglass stem and said second channel (18) being configured for retaining an anchor member within said sleeve member; and (c) a clip (51), as shown in FIG. 4, comprising an anchor member (53) and a logo-bearing arm (52), said anchor member being retained within said second channel (18) and said anchor member having a first edge (53a) and said logo-bearing being secured to said first edge (53a) of said anchor member (53) and oriented over the outer surface (15) of said sleeve member (13).

Figure 3:
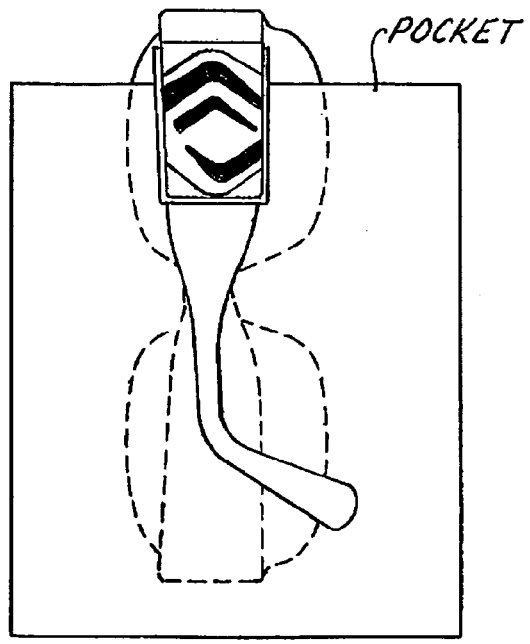
FIG. 3 shows eyeglasses secured to the chest pocket of the wearer by means of a clip according to the present invention.

Preferably, the arm is arcuately oriented to provide engagement of the tip (52a) of the logo-bearing arm with the outer surface of the sleeve whereby the eyeglasses may be firmly secured to the pocket of the eyeglass wearer. (See FIG. 3.)

The material of construction of the sleeve is preferably a cloth, plastic, rubber or foam fabric or sheet having the gripping properties necessary to easily insert the clip into the sleeve and retain said clip therein, but enables the eyeglass wearer to remove the clip from the sleeve if desirable. The clip is preferably a metal having resiliency or spring to enable the eyeglass wearer to reversibly clip the device of the invention to a shirt pocket or other garment of a wearer.

The device also includes a logo which can be either the logo-bearing arm (52) itself or attached to the logo-bearing arm (52). The logo is preferably made of metal or may be printed or painted on the logo-bearing arm (52) or sleeve member (13). Said logo may also be a separate cloth or film which is adhered to the logo-bearing arm or sleeve member (13) by an adhesive or hot pressed on said sleeve member (13).

Figure 5A:
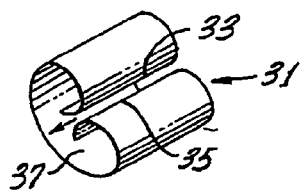
FIG. 5A shows a method of fabricating the device of this invention.
Figure 5B:
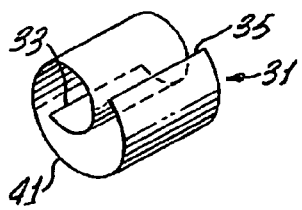
FIG. 5B shows an alternate method of fabricating the device of this invention.
Figure 2:
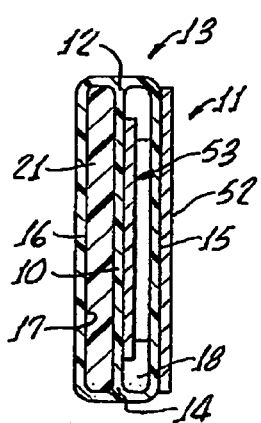
FIG. 2 shows a cross sectional view of the sleeve of the device of this invention taken along line 2-2'. The cross sectional view includes the stem of the eyeglass frame retained within the first channel 16 and the anchor member 53 of the clip 51 retained within said second channel 18 and the logo bearing arm 52 oriented over the outer surface 15 of the sleeve member 13.

While a specific preferred embodiment of the invention has been described, it will be recognized by those skilled in the art that variations may be made without departing from the spirit and scope of the invention, as described in the appended claims. In particular, while the sleeve is shown, functionally, as a sleeve which is divided internally into two chambers by a separate dividing member, preferably said sleeve and said dividing member are a single substantially rectangular flat material which is rolled to form the internally divided sleeve. FIGS. 5a and 5b show the steps of making the sleeve from a single substantially rectangular flat material sheet (31) by rolling said sheet and securing the opposing edges (33) and (35) of said sheet to the surface (37) of said sheet to form the sleeve with two inner internal channels or chambers. As shown, the opposing edges (33) and (35) may be secured by direct contact of said edge with the surface of the sheet or one or both edges may be secured indirectly to the surface of the sheet by securing the opposite surface of said sheet (41) adjacent to said indirectly secured edge (33) to said surface of said sheet. For each of these methods of fabrication the result is a sleeve having two internal channels or chambers for combination of the above described clip to form the device of this invention.

The invention claimed is:

1. A device for securing to the stem of an eyeglass frame comprising;
   (a) a sleeve member having an inner surface and an outer surface;
   (b) a dividing member within said sleeve member, said dividing member having a first edge and a second edge, said first edge being secured to the inner surface of said sleeve member along a first line and said second edge being secured to a second line that is substantially parallel to said first line and spaced therefrom to thereby define a first channel and a second channel within said sleeve member, said first channel being configured for receiving an eyeglass stem and securing said device to said eyeglass stem and said second channel being configured for retaining an anchor member within said sleeve member; and
   (c) a clip comprising an anchor member and an arm, said anchor member being retained within said second channel and said anchor member having a first edge and said being arm secured to said first edge of said anchor member and oriented over the outer surface of said sleeve member.

2. The device of claim 1 wherein said sleeve member comprises a resilient material capable of resiliently engaging the stem of an eyeglass frame body to reversibly secure said device to said stem of said eyeglass frame body.

3. The device of claim 1 wherein said dividing member comprises a resilient material capable of resiliently engaging the stem of an eyeglass frame body to reversibly secure said device to said stem of said eyeglass frame body.

4. The device of claim 1 wherein said sleeve member and said dividing member comprise a resilient material capable of resiliently engaging the stem of an eyeglass frame body to reversibly secure said device to said stem of said eyeglass frame body.

5. The device of claim 1 wherein said anchor member comprises a rigid material formed to provide multiple gripping points along said stem of said eyeglass frame body.

6. The device of claim 5 wherein said rigid material is selected from the group consisting of plastic and metal.

7. The device of claim 1 wherein said sleeve is a resilient polymeric sheet of cloth, plastic, rubber or foam fabric.

8. The device of claim 1 wherein said a sleeve is divided internally into two chambers by a dividing member, wherein said sleeve and said dividing member are a single substantially rectangular flat material which is rolled to form the internally divided sleeve.

9. The device of claim 8 said sleeve is fabricated from a single substantially rectangular flat material sheet by rolling said sheet and securing the opposing edges of said sheet to the surface of said sheet to form the sleeve with two inner internal channels or chambers.

10. The device of claim 9, wherein the opposing edges of said sheet are secured by direct contact of said edge with the surface of the sheet.

11. The device of claim 9, wherein one or both edges are secured indirectly to the surface of the sheet by securing the opposite surface of said sheet adjacent to said indirectly secured edge to said surface of said sheet.

* * * * *